United States Patent [19]

Tricoles et al.

[11] 4,386,356

[45] May 31, 1983

[54] ANTENNA SYSTEM EMPLOYING A SELF-REFERENCING MICROWAVE INTERFEROMETER FOR DIRECTION FINDING

[75] Inventors: Gus P. Tricoles, San Diego; Eugene L. Rope, El Cajon, both of Calif.

[73] Assignee: General Dynamics/Electronics Division, San Diego, Calif.

[21] Appl. No.: 85,408

[22] Filed: Oct. 17, 1979

[51] Int. Cl.[3] .......... G01S 5/02

[52] U.S. Cl. .......... 343/113 R

[58] Field of Search .......... 343/113 R, 117 A; 244/3.13, 3.14

[56] References Cited

PUBLICATIONS

Tricoles et al., *Guide Waves in a Dielectric Slab, Hollow Wedge, and Hollow Cone,* Journal of the Optical Society of America, vol. 55, No. 3, pp. 328–330, Mar. 1965.

*Primary Examiner*—Theodore M. Blum

*Attorney, Agent, or Firm*—Brown & Martin

[57] ABSTRACT

A direction finding antenna system including a self-referencing interferometer for determining the direction of a source that emits plane wave radiation. The interferometer includes a slab of dielectric material for passing incident plane waves and for guiding coherent waves excited by the incident plane waves, whereby the guided waves interfere with the incident plane waves passing through the slab to form intensity fringe patterns, wherein the fringe spacing in a given dimension along the non-incident surface of the slab equals $2\pi(K_g - K_o \sin \theta)^{-1}$, wherein $K_g$ is the propagation constant of the dielectric material, $K_o$ is the propagation constant of free space, and $\theta$ is the angle between the normal to the incident surface of the slab and the direction of the incident plane waves. The interferometer further includes an array of sensors distributed on the non-incident surface of the slab for providing sensing signals that indicate the intensity of the interfering waves at predetermined locations on the non-incident surface of the slab. The antenna system is particularly useful in a randome of a guided missile or aricraft.

8 Claims, 6 Drawing Figures

ANTENNA SYSTEM EMPLOYING A SELF-REFERENCING MICROWAVE INTERFEROMETER FOR DIRECTION FINDING

BACKGROUND OF THE INVENTION

The present invention generally pertains to antenna systems and is particularly directed to a new class of direction finding antenna that are useful in radomes.

With conventional direction finding antenna systems, the radome of a guided missile as an element of a proportional navigation system, the radome degrades the guidance accuracy of the navigation system. This is because the radome generates boresite error that is dependent upon the direction of the target. Radomes also degrade navigation systems through attenuation, by reducing the range of the antenna and by increasing the sidelobe levels in the antenna radiation pattern. Notwithstanding these difficulties, radomes can hardly be eliminated from guided missiles.

SUMMARY OF THE INVENTION

The present invention is based upon the phenomenon that a plane wave incident on a dielectric slab, wedge or hollow shell excites guided waves. These waves are coherent with the incident wave and the wave propagated through the dielectric. Therefore, the guided wave interferes with the other waves to form fringe patterns. The spacing "X" of the fringes in a given dimension of the fringe pattern is expressed by the following equation:

$$X=2\pi(K_g-K_o\sin\theta_i)^{-1} \quad (1)$$

where $K_g$ is the propagation constant of the guided wave, $K_o$ is the propagation constant of the incident wave, and $\theta$ is the angle between the normal to the incident surface and the direction of the incident plane waves. Since $K_o$ and $K_g$ are known quantities and "X" can be determined by measurement, the angle $\theta$ may be computed in accordance with equation (1).

In accordance with the foregoing, the present invention provides a self-referencing microwave interferometer and a novel direction finding antenna system that includes the interferometer for determining the direction of a source that emits plane wave radiation.

The self-referencing interferometer of the present invention includes a slab of dielectric material for passing incident plane waves and for guiding coherent waves excited by the incident plane waves, whereby the guided waves interfere with the incident plane waves passing through the slab to form intensity fringe patterns, wherein the fringe spacing in a given dimension along the non-incident surface of the slab equals $2\pi(K_g-K_o\sin\theta)^{-1}$, wherein $K_g$ is the propagation constant of the dielectric material, $K_o$ is the propagation constant of free space, and $\theta$ is the angle between the normal to the incident surface of the slab and the direction of the incident plane waves. The interferometer also includes an array of sensors distributed on the non-incident surface of the slab for providing sensing signals that indicate the intensity of the interfering waves at predetermined locations on the non-incident surface of the slab.

The direction finding antenna system of the present invention includes the self-referencing interferometer wherein the sensors are distributed in a two dimensionl array: a first signal processor coupled to an array of the sensors in a first dimension for processing the respective sensing signals to provide first data signals that indicate the fringe spacing in the first dimension; a second signal processor coupled to an array of the sensors in a second dimension that is non-parallel to the first dimension for processing the respective sensing signals to provide second data signals that indicate the fringe spacing in the second dimension; and a third signal processor coupled to the first and second processors for processing the first and second data signals to provide a third data signal that indicates the direction of propagation of the incident plane waves. This antenna is in effect a self-referencing interferometer.

The direction finding antenna system of the present invention is particularly useful in radomes. The fringe spacings are large enough to permit adequate sampling to determine "X", but small enough to provide a practical fit of multiple fringes within a radome used on a missile or aircraft.

In the missile or aircraft radome, separate measurements and computations are taken from linear arrays of sensors running longitudinally and from circumferential arrays of sensors, and then the separate computations are combined to provide the direction of the incident wave in three-dimensional space.

Additional features of the present invention are discussed in the description of the preferred embodiment.

DESCRIPTION OF THE PREFERRED EMBODIMENT

Figure 1:
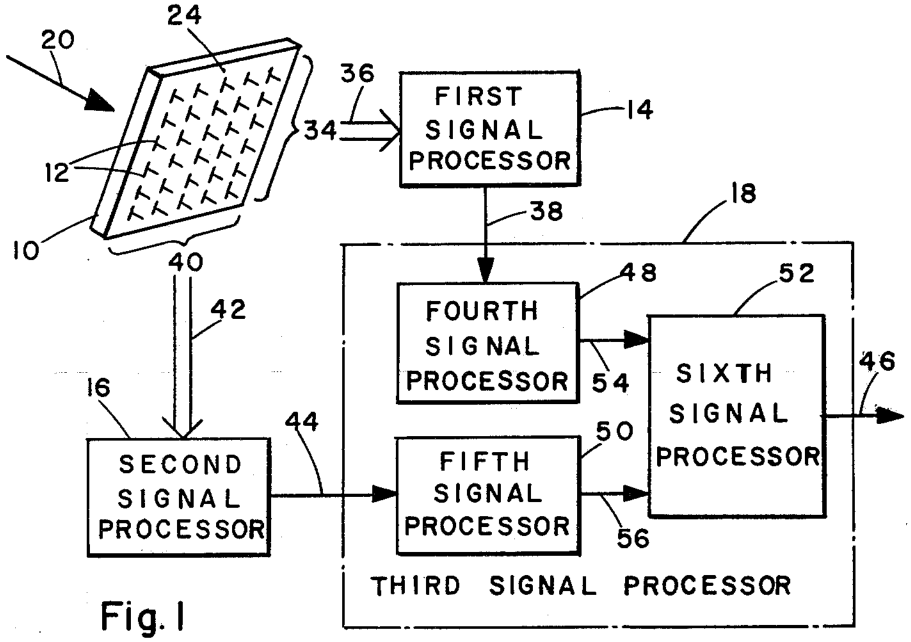
FIG. 1 is a schematic diagram of a preferred embodiment of an antenna system according to the present invention.

Referring to FIG. 1, a preferred embodiment of an antenna system includes a slab of dielectric material 10, a two-dimensional array of sensors 12, a first signal processor 14, a second signal processor 16 and a third signal processor 18. A preferred embodiment of the self-referencing interferometer of the present invention is provided by the combination of the slab of dielectric material 10 and the array of sensors 12.

Figure 2:
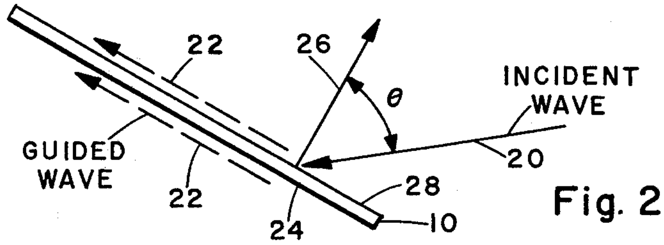
FIG. 2 illustrates the excitation of coherent guided waves along the surfaces of a dielectric material slab in response to incident plane wave radiation.

Referring to FIG. 1, the slab of dielectric material 10 passes incident plane waves 20 and for guided coherent waves 22 that are excited by the incident plane waves 20. The guided waves 22 interfere with the incident plane waves 20 passing through the slab 10 to form intensity fringe patterns. The fringe spacing in a given dimension along the non-incident surface 24 of the slab 10 equals $2\pi(K_g-K_o\sin\theta)^{-1}$, wherein $K_2$ is the propagation constant of the dielectric material, $K_o$ is the propagation constant of free space, and $\theta$ is the angle between the normal 26 to the incident surface 28 of the slab 10 and the direction of the incident plane waves 20. The sensors 12 are not shown in FIG. 2 in order to simplify this illustration.

The sensors 12 are distributed in a two dimensional array on the non-incident surface 24 of the slab 10 as shown in FIG. 1, for providing sensing signals that indicate the intensity of the interfering waves at predetermined locations on the non-incident surface 24 of the slab 10. Preferably, the sensors 12 are half-wave dipole antennas.

Phase coherence and corporate feed of the signals produced by the individual sensors 12 are not required because the sensors 12 need measure only intensity.

Figure 3:
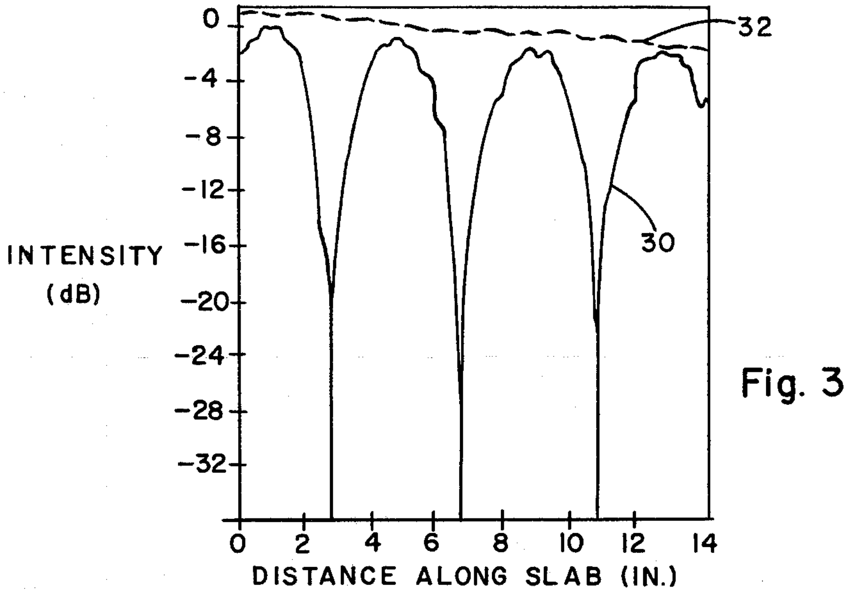
FIG. 3 shows a fringe pattern waveform detected in accordance with the present invention in contrast with a pattern of incident plane wave radiation.

An interference fringe pattern in one dimension is shown by the solid-line waveform 30 in FIG. 3 that was produced in response to incident plane wave radiation at an angle $\theta$ of 70°.

A linear array of sensors 12 positioned on a flat dielectric slab 10 was utilized to produce the fringe pattern shown in FIG. 3. This fringe pattern was produced by sampling the intensity of the signals produced at each of sensors 12. The dashed-line waveform 32 was produced by sampling the intensity of the signals produced at similarly positioned sensors in response to incident plane wave radiation in the absence of a dielectric material slab. The minima in the fringe pattern waveform 32 of FIG. 3 are the interference minima on the non-incident surface 24 of the dielectric material slab 10.

The first signal processor 14 is coupled to a first linear array 34 of the sensors 12 in a first dimension for processing the respective sensing signals provided on lines 36 by the coupled sensors 34 to provide first data signals on line 38 that indicate the fringe spacing in the first dimension.

The second signal processor 16 is coupled to a second linear array 40 of the sensors 12 in a second dimension that is non-parallel to the first dimension for processing the respective sensing signals provided on lines 42 by the coupled sensors 40 to provide second data signals on line 44 that indicate the fringe spacing in the second dimension.

Figure 4:
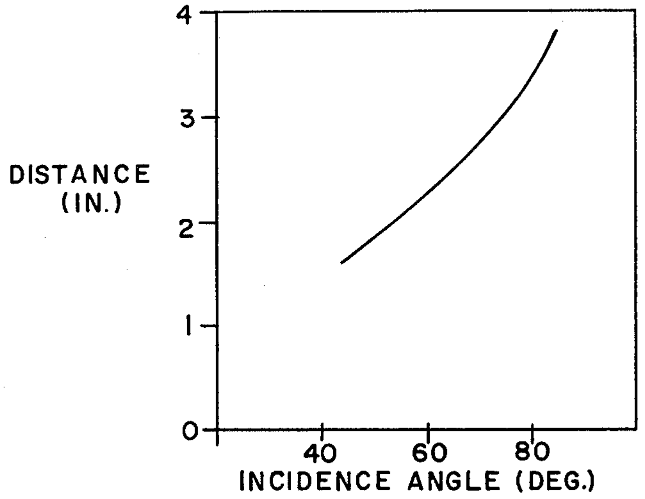
FIG. 4 is a characteristic curve of the variation of the location of the first interference pattern minimum relative to the edge of the dielectric material waveform slab in relation to incidence angle.

Fringe spacing may be determined by processing the signals from the sensors 12 to determine the location of the interference minima on the slab 10. Alternatively, the fringe spacing may be determined by processing the signals from the sensor 12 to determine the location of the first interference pattern minimum relative to the edge of the slab nearest the source of the incident wave. FIG. 4 shows how the position of this minimum varies with incidence angle. However, at certain distances and at certain frequencies there will be ambiguities using this alternative processing technique.

The third signal processor 18 is coupled to the first and second signal processors 14 and 16 for processing the first and second data signals on lines 38 and 44 to provide a third data signal on line 46 that indicates the direction of propagation of the incident plane waves 20. The third signal processor includes a fourth signal processor 48, a fifth signal processor 50 and a sixth signal processor 52.

The fourth signal processor 48 is coupled to the first signal processor 14 for processing the first data signal received on line 38 to provide fourth data signals on line 54 that indicate the angle of incidence of the incident plane waves 20 relative to the first dimension.

The fifth signal processor 50 is coupled to the second signal processor 16 for processing the second data signals received on line 44 to provide fifth data signals on line 56 that indicate the angle of incidence of the incident plane waves 20 relative to the second dimension.

The sixth signal processor 52 is coupled to the fourth and fifth signal processors 48 and 50 for processing the fourth and fifth data signals received on lines 54 and 56 to provide the third data signal on line 46.

Figure 5:
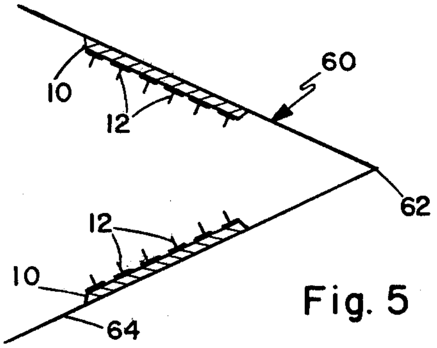
FIG. 5 is a schematic diagram showing one preferred embodiment of the self-referencing interferometer in a radome.
Figure 6:
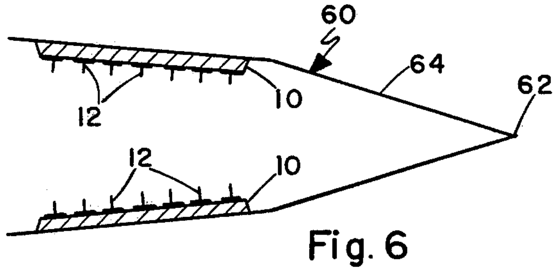
FIG. 6 is a schematic diagram showing an alternative preferred embodiment of the self-referencing interferometer in a radome.

The antenna system of the present invention is advantageously employed in the radome of a guided missile or aircraft. FIGS. 5 and 6 illustrate two alternative preferred embodiments wherein the dielectric material slab 10 is positioned in the wall 58 of a radome 60. The slab 10 is shown in section in these two Figures. Sensors 12 are distributed on the slab 10 both longitudinally and circumferentially. There are two important criteria that must be satisfied in the radome embodiment. The dimensions of the slab 10 must be sufficiently large to permit guided wave excitation in two non-parallel dimensions. Also the slab 10 must be spaced from the vertex 62 because of aerodynamics heating. Increased spacing of the slab 10 from the vertex 62 avoids the effects of high temperatures, upon the dielectric material properties.

In the embodiment shown in FIG. 5, a self-referencing interferometer including the dielectric material slab 10 and sensors 12 is located in the forward wedge 64 of the radome 60. In the embodiment shown in FIG. 6, a sef-referencing interferometer including the dielectric material slab 10 and sensors 12 is located on a more blunt wedge 66 of the radome 60 beyond the forward wedge 64. The embodiments of FIGS. 5 and 6 can be combined, whereby separate self-referencing interferometers are on both the forward wedge 64 and the more blunt wedge 66 for operation in different frequency bands.

Separate interferometers also can be provided by locating separate non-circumferential slabs 10 on opposite sides of the axis of the radome 60, when both interferometers operating in the same frequency band. The output signals of the separate interferometers can be compared or combined to improve resolution.

Missile radomes are usually curved shells, such as cones or ogives. Equation (1) provides the fringe spacing distance for flat dielectric material slabs. Nevertheless equation (1) is applied to the radome embodiments wherein the slab 10 is shaped in accordance with the curvature of the radome 60. This is because the field distribution of guided waves near curved surfaces include waves having the propagation constants of the waves guided by a flat slab.

We claim:

1. A direction finding antenna system for determining the direction of a source that emits plane wave radiation, comprising:

a slab of dielectric material for passing incident plane waves and for guiding coherent waves excited by the incident plane waves, whereby the guided waves interfere with the incident plane waves passing through the slab to form intensity fringe patterns, wherein the fringe spacing in a given dimension along the non-incident surface of the slab equals $2\pi(K_g - K_o \sin\theta)^{-1}$, wherein $K_g$ is the propagation constant of the dielectric material, $K_o$ is the propagation constant of free space, and $\theta$ is the angle between the normal to the incident surface of the slab and the direction of the incident plane waves;

a two dimensional array of sensors distributed on the non-incident surface of the slab for providing sensing signals that indicate the intensity of the interfering waves at predetermined locations on the non-incident surface of the slab;

first processing means coupled to an array of the sensors in a first dimension for processing the respective sensing signals to provide first data signals that indicate the fringe spacing in the first dimension;

second processing means coupled to an array of the sensors in a second dimension that is non-parallel to the first dimension for processing the respective sensing signals to provide second data signals that indicate the fringe spacing in the second dimension; and third processing means coupled to the first and second processing means for processing the first and second data signals to provide a third data signal that indicates the direction of propagation of the incident plane waves.

2. A system according to claim 1, wherein the third processing means comprises:

fourth processing means coupled to the first processing means for processing the first data signals to provide fourth data signals that indicate the angle of incidence of the incident plane waves relative to the first dimension;

fifth processing means coupled to the second processing means for processing the second data signals to provide fifth data signals that indicate the angle of incidence of the incident plane waves relative to the second dimension; and sixth processing means coupled to the fourth and fifth processing means for processing the fourth and fifth data signals to provide the third data signal.

3. A system according to claims 1 or 2, wherein the sensors comprise half-wave dipole antennas.

4. In a radome, a direction finding antenna system for determining the direction of a source that emits plane wave radiation, comprising:

a slab of dielectric material in a radome wall for passing incident plane waves and for guiding coherent waves excited by the incident plane waves, whereby the guided waves interfere with the incident plane waves passing through the slab to form intensity fringe patterns, wherein the fringe spacing in a given dimension along the non-incident surface of the slab equals $2\pi(K_g-K_o \sin \theta)^{-1}$, wherein $K_g$ is the propagation constant of the dielectric material, $K_o$ is the propagation constant of free space, and $\theta$ is the angle between the normal to the incident surface of the slab and the direction of the incident plane waves;

a two dimensional array of sensors distributed on the non-incident surface of the slab for providing sensing signals that indicate the intensity of the interfering waves at predetermined locations on the non-incident surface of the slab;

first processing means coupled to an array of the sensors in a first dimension for processing the respective sensing signals to provide first data signals that indicate the fringe spacing in the first dimension;

second processing means coupled to an array of the sensors in a second dimension that is non-parallel to the first dimension for processing the respective sensing signals to provide second data signals that indicate the fringe spacing in the second dimension; and third processing means coupled to the first and second processing means for processing the first and second data signals to provide a third data signal that indicates the direction of propagation of the incident plane waves.

5. A system according to claim 4, wherein the third processing means comprises:

fourth processing means coupled to the first processing means for processing the first data signals to provide fourth data signals that indicate the angle of incidence of the incident plane waves relative to the first dimension;

fifth processing means coupled to the second processing means for processing the second data signals to provide fifth data signals that indicate the angle of incidence of the incident plane waves relative to the second dimension; and sixth processing means coupled to the fourth and fifth processing means for processing the fourth and fifth data signals to provide the third data signal.

6. A system according to claims 4 or 5, wherein the sensors comprise half-wave dipole antennas.

7. A self referencing interferometer, comprising:

a slab of dielectric material for passing incident plane waves and for guiding coherent waves excited by the incident plane waves, whereby the guided waves interfere with the incident plane waves passing through the slab to form intensity fringe patterns, wherein the fringe spacing in a given dimension along the non-incident surface of the slab equals $2\pi(K_g-K_o \sin \theta)^{-1}$, wherein $K_g$ is the propagation constant of the dielectric material, $K_o$ is the propagation constant of free space, and $\theta$ is the angle between the normal to the incident surface of the slab and the direction of the incident plane waves;

an array of sensors distributed on the non-incident surface of the slab for providing sensing signals that indicate the intensity of the interfering waves at predetermined locations on the non-incident surface of the slab.

8. An interferometer according to claim 7, wherein the sensors comprise half-wave dipole antennas.

* * * * *